3,606,507
MAGNETIC SHEET HOLDERS, OPEN-ENDED SLIDES AND AN INFORMATION PRESENT-RETRIEVE COMMUNICATIONS SYSTEM EMPLOYING THE SAME
Paul Gilmore Williams, Jr., Westport, Conn., assignor to Williams Inlan Corporation, Westport, Conn.
Continuation-in-part of application Ser. No. 751,278, Aug. 8, 1968. This application May 19, 1969, Ser. No. 825,896
Int. Cl. A47b 63/00; G09f 3/18
U.S. Cl. 312—184
9 Claims

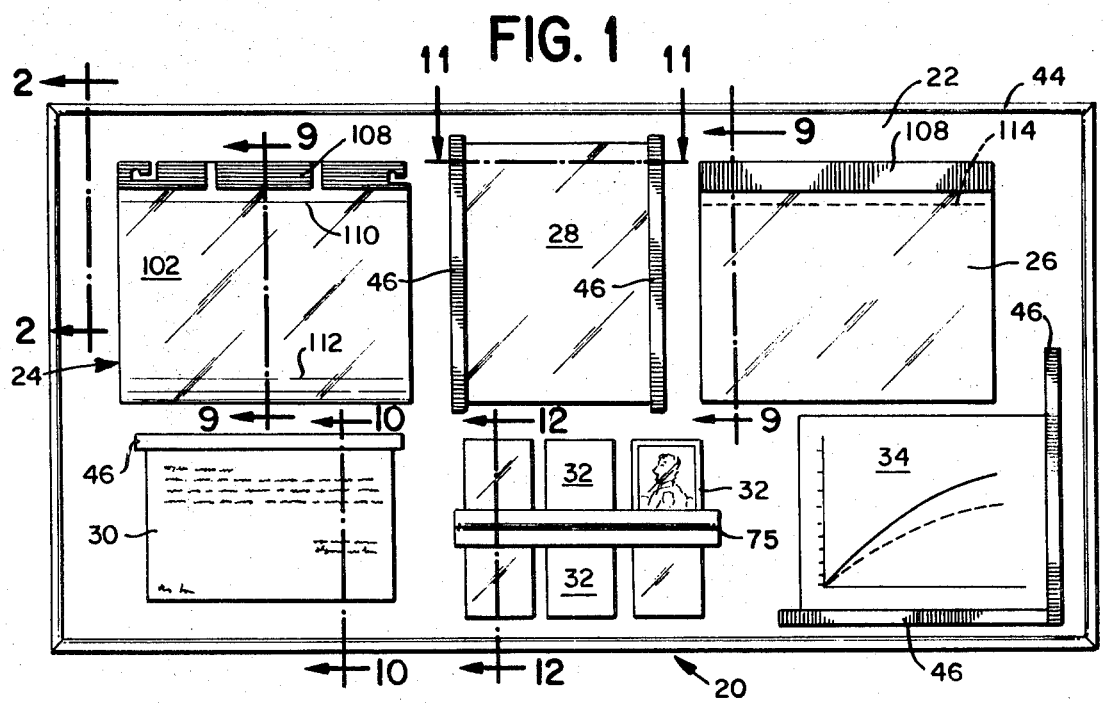
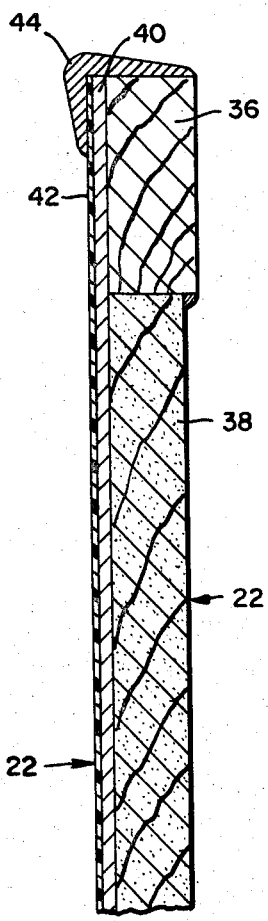
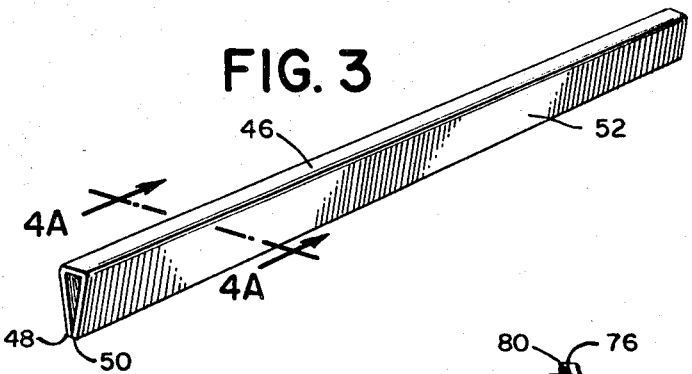
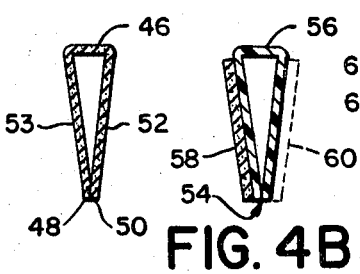
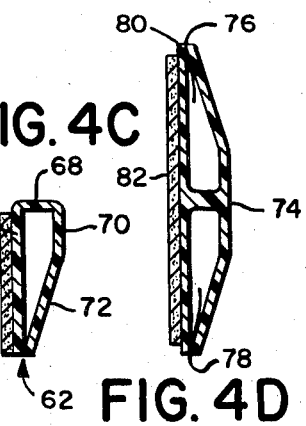
INVENTOR
PAUL GILMORE WILLIAMS, JR.
BY
MATTERN WARE & DAVIS
ATTORNEYS

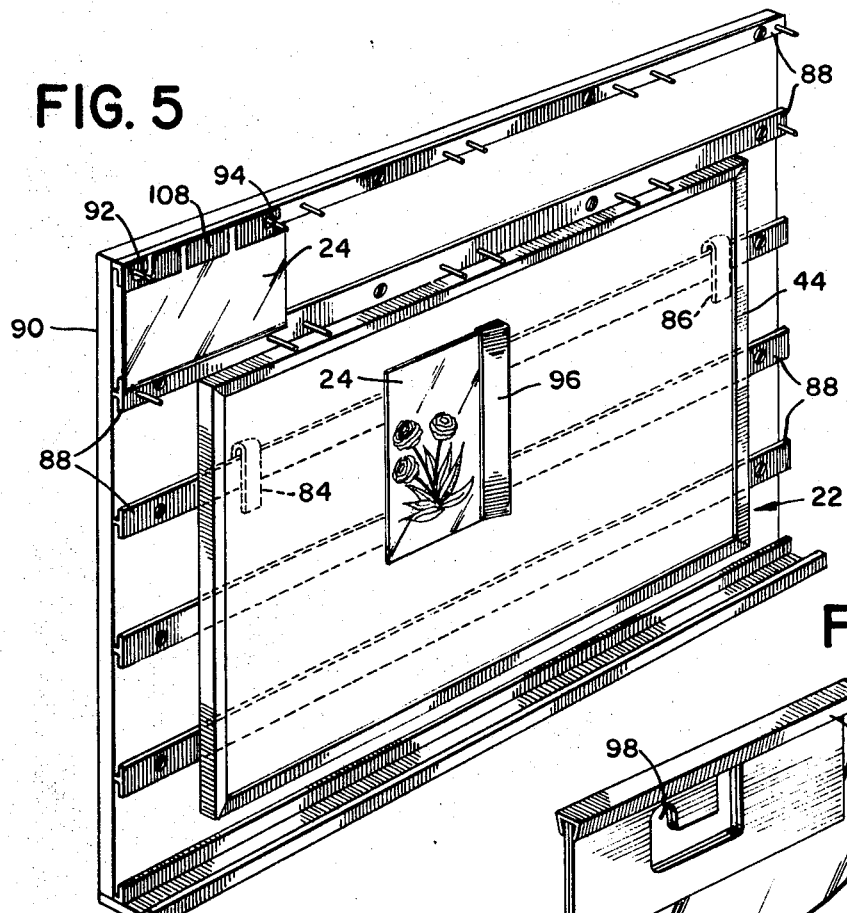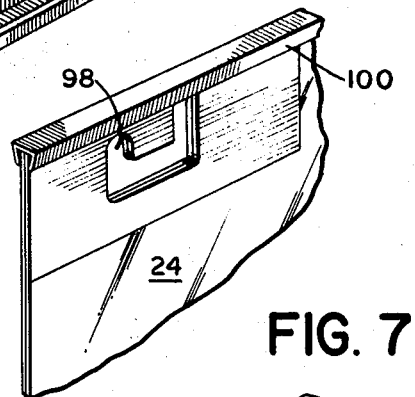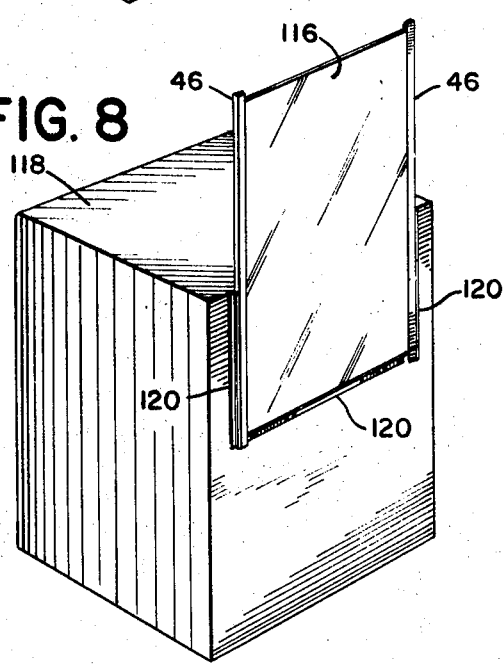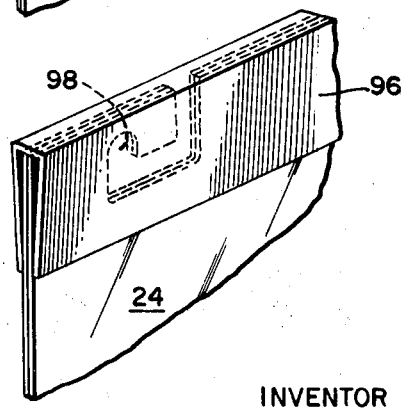

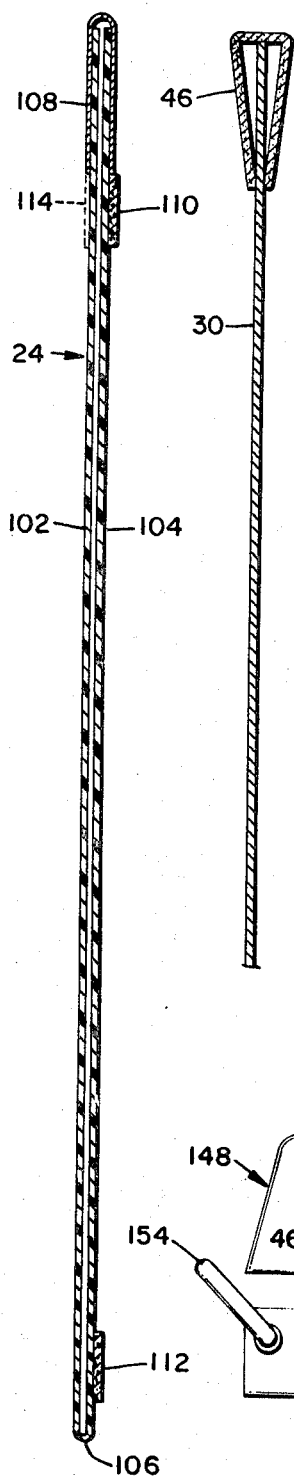
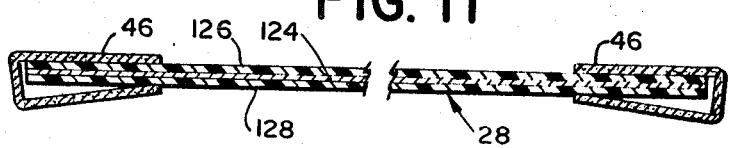
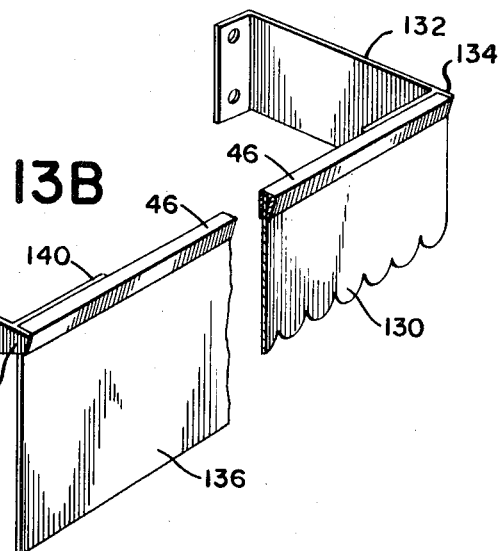
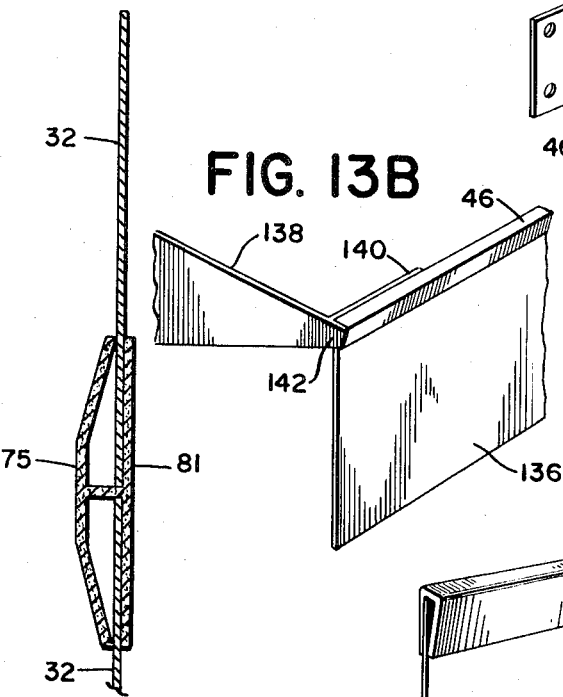
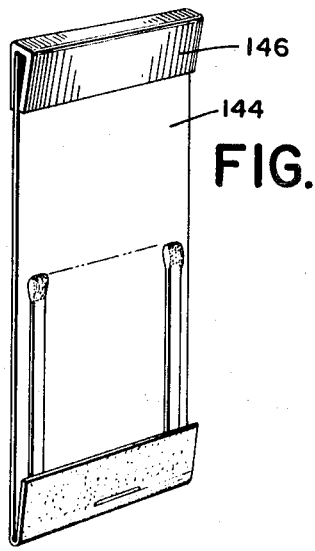
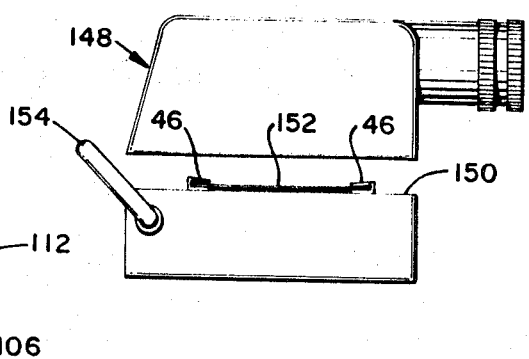

ABSTRACT OF THE DISCLOSURE

An integrated system for presenting and retrieving moveable pictures or icons. A transparent suspension file folder has magnets attached thereto for instant display of material on a iron plate display board.

The iron surface of the display board is covered with a washable plastic material so that it can be written on with washable ink. The magnets are so placed on the file folder that they cooperate in temporarily affixing the same against the iron bed of an opaque, or the iron frame of a transparency, projector.

Magnetic instant display transparent art folders are also disclosed.

One form of magnet disclosed is a U-shaped magnetic spine which is easily attachable and detachable from the transparent file folders of the invention. Another takes the form of one or two, preferably flexible, magnetic strips adhered to one side of a transparent file folder along one or both the long edges thereof.

RELATED PATENTS AND APPLICATIONS

The subject matter of the present application is closely related to the application of Inez C. Yoder, Ser. No. 825,649, filed herewith, entitled Magnetic Sheet Holders, Open-Ended Slides and an Information Present-Retrieve Communications System Employing the Same, and is a continuation-in-part of my copending application Ser. No. 751,278 filed Aug. 8, 1968 entitled Management Decision Making, Planning, Filing, Rapid Retrieval and Communication. The present application also represents further advances and continuations of problem solving technology as represented by U.S. Patent No. 3,418,730 issued to Paul Gilmore Williams, Jr. on Dec. 31, 1968 and entitled Problem Solving Equipment. Said copending applications and the earlier patent are incorporated herein by reference.

SUMMARY OF THE INVENTION

This invention relates to magnetic sheet holders, open-ended slides and an information present-retrieve communications system employing the same. More particularly, it relates to magnetic sheet holders, open-ended slides and related integral designs for a single common commuications medium for presenting, filing, retrieving, creating, processing, projection and control of information.

The object of the earlier Williams application and this continuation-in-part has been to provide the human manager materially greater flexibility, speed, precision, persuasiveness and economy by being able to use the exact same transparent jackets he uses in sketching his ideas and plans for the additional and concurrent management purposes of display, filing, retrieving, processing, optical projection and control.

The earlier Williams application provides for such versatility and flexibility by virtue of a transparent jacket which is notched at the top to permit it to move fore and aft on horizontal rods when used for (1) filing and retrieval, or (2) to change the positional meaning of a program when used in problem solving. These notches also permit hanging of the jackets on the pins of a display board for either (1) presentation purposes or (2) the collating and rearranging of ideas.

That application further provides moveability by providing parallel rails on the vertical surfaces of the various problem solving and communications tools to permit the transparent jackets to be moved left or right as well as the above mentioned fore and aft capability.

The present application takes the system's flexibility another major step forward by providing a magnetic attaching means which permit moving the jackets up and down (or at random) as well as the previously provided for left and right and fore and aft capabilities. This magnetic means may be integral with the jacket or take the form of a U-shaped magnetic spine. The plastic covered steel board illustrated is designed to serve as an optical projection board, a washable diagramming (or drawing) board, in addition to its obvious ability to attract the magnets. In addition, the new board disclosed herein is equipped with hooks on its back so that it will instantly hang on the rails of the larger boards covered by the copending application.

The broad scope of end uses for which the transparent communications jackets are applicable is illustrated further by its concurrent function as an open-ended (letter size) slide. By utilizing an opaque projector, for example, the jacket and its contents can be projected immediately to the projection screen (FIG. 1) without the necessity of making transparencies, which is the case for most competing modes today for optical presentation.

To sum up: this same open-ended slide is immediately storable as a filing jacket in standard filing cases, or moveable fore and aft on suspension file equipment, moveable fore and aft on rods disclosed in the above-identified Williams patent, instantly displayable on planning board pins, or movable left and right as covered by our copending application; and now with the addition of the U-channeled magnetic spine and its variations disclosed in this application the transparent jacket is displayable in any other position, either on the plastic covered metal board (FIG. 1) or flexibly on any other piece of steel office equipment or furniture. The horizontal "identification bar-drawer pull" of the two-drawer lateral files disclosed in the above-identified Williams application is one of the numerous places where the magnetic spines are used.

In short, both the magnetic, notched transparent jacket and the magnetic spine working alone serve what is functionally described as a "picture hold-on technology." And since the whole idea is to let the held-onto pictures explain themselves instantly via the transparency or openness of such content, this new communications process medium can also be accurately described as an "Instant Language" idea (or meaning) transfer process.

The fact that these tools are as appealing to corporate controller as they are to marketing men explains why the system is so successful in achieving integrated planning-programming-budgeting systems. The fact that it is grapically attractive as well as precise explains why it has proven to be a workable interface solution between the human managers' decision making process and the electronic media (computers and TV) at their disposal.

The prior art

With the growth of modern information, storage and retrieval systems and the extension of man's various senses by means of new machines, media and tools, it becomes more and more evident that man's greatest tasks and opportunities lie in achieving data processing procedures so that they can serve concurrently as genuine management communications systems. A pile of computer print-outs from which a meaningful pattern must still be abstracted does not constitute genuine communication in any sense of the meaning of that term.

One of man's greatest current frustrations comes from attempting to solve today's problems with yesterday's tools. By "tools" we are referring as much to clearly outmoded procedural attitudes and methods as we are to physical equipment. Paradoxically it is concurrently a matter of grave concern to all of us that advanced technology—as represented by the electronic media (especially computers)—are disturbingly far ahead of man's ability to use them. In this particular instance, "the cart is ahead of the horse" and the economic waste is substantial.

In short, there has been a "missing link"—very substantial shortcomings in the intermediate business technologies and methodologies which in combination represent the process vacuum to be filled in a now widely sought for interface between man's own good mind and the speed-of-light capabilities of the computer and its related electronic technology. Sometimes this vacuum need is referred to as "software" but such a term is wholly inadequate in the light of the still largely neglected top management need factors of the total problem. It is the electronic data processing technicians who seek better software—not top managers.

All of this explains, of course, the present sometimes conflicting vogues and interst in "planning consultants"; the now widespread establishment of corporate planning offices; the earlier and continued attention being given to Operations Research and System Analysis; and to increasingly extensive efforts to establish integrated Planning-Programming-Budgeting Operations.

But in spite of this lip service, "planning" is still a relatively unpopular functional concept among corporate executives. And it is important to stress here that such opposition is on thoroughly valid ground insofar as planning is generally practiced in today's economy.

Jerome Brunner states the problem—and its corresponding opportunity—quite succinctly:

"It is perhaps most characteristic of our national enterprise that the concept of management rather than a doctrine of 'planning' has become central. Management is planning that is subject to moment-by-moment revision by human intelligence. While it, like most emerging conceptions, is vaguely defined, its core is the exercise of decision based on human appraisal. That theories of decision making abound today is not historical accident."

The system of the earlier Williams patent provides a practical on-the-job solution rather than a theory—for the interrelated problems of decision making and planning. Planning itself can now be geared to the reality that many of a corporation's most important events are not programmable at all. Planning according to that invention serves primarily as a tool which enables management to see its daily options faster and more clearly than has been possible with traditional methods.

In short, in accordance with that invention, we start and stay with—on a live, real-time basis—the prime never ending task of decision making. It goes without saying that this is still an entirely human requirement—a matter of "first things first" management attitudes. But the physical breakthroughs involved—tools which make possible a much more rapid transfer of meaning from one executive to another—are nonetheless real and significant.

The key concept is "transfer" which is at once both physical (that is, technological) and intellectual (methodological). What has been achieved in this sense is to combine the two, that is, To create an integral, open-ended, flexible and self-correcting process which interrelates the two: specifically, adds a Picture Hold-On technology to a heuristic, cluster identifying way of thinking or methodology to yield a process for achieving materially upgraded management decision-making capabilities via better design of the corporation's internal information flow.

Expressed another way:

With better decision making—and not that abstraction from the totality of management known as "planning" identified as the more fundamental essence of managements' priority needs, we had to ask ourselves what kinds of more relevant management art—what kind of persuasively interrelating process has to be invented if we are to have tomorrow's decision-making tools today Articulated from the vantage point of still another goal, how can we build a process which enables us to make the most profitable decisions possible today in a way which concurrently provides for—in fact, determines the future by more adequate and more flexible picturing concepts, instead of letting the future just happen to us?

These, then, have been the goals and what follows offers a description of the solutions found to date.

In its simplest dimensions, the present invention allows one to seek out and to "hold-on" to the pieces of rapidly evolving patterns—it is a technology which can position other technologies.

The goal is to provide means for people to: (1) Learn how to look for specific patterns of rapidly changing conditions, that is learn how to see such opportunity patterns faster and more precisely and (2) learn better ways of holding on to the pieces of such pictures until meaningful patterns can be ascertained.

In recent years, it has become fashionable at long last for managers to set more specific and more adequately defined goals as to what they are trying to change for the better. But their ability to picture such goals precisely and persuasively to others often remains quite primitive, with the exception, of course, of the professionals in the marketing areas of the business.

In all events, their abilities to identify and to picture the specific strategies for achieving goals are even more under-developed.

As indicated, the goal is to "change things for the better" within these very precise contexts, that is, to help all executives do a materially better job of cutting right through to the core structures of problem opportunities—help them compress time by concentrating on goals and strategies, rather than waste time by writing fancy sentences.

The recent popularity of speed reading courses misses the main point of the problem to be coped with in our opinion. Even at vastly acceleraated reading speeds, the mind is still too often being asked to traverse a sequential one-thing-at-a-time mode of understanding and meaning transfer. As everyone knows full well who has kept abreast of the mushrooming growth of TV, motion pictures—and especially the combinations of tools found in the newer mixed media techniques—the human mind works much more effectively when it is given an opportunity to cope with properly structured parallel or concurrent multiple image juxtapositions.

The term "icon" or "image of the real thing" is stressed because the communications message of our time is clearly that of "Show me, don't tell me!"

In short, highly effective—and universally applicable—pictographic skills of all kinds are rapidly emerging now throughout our global village. And one of the principal goals of this invention is to help people keep abreast of and to coordinate these new communications capabilities as they come along.

Except to those already deeply involved in today's practical solutions to more effective corporate internal communications, the concept of the manager's office functioning today as a photographic set might make little sense at all at first glance. As Marshall McLuhan says—people tend to see only the content of their lives—not its environmental form.

Yet, a photographic set is precisely what the office has become in one major functional area, even though its orientation is still much more typographic than it is pictographic.

Tuned in, executives everywhere now are already working a great deal more in the sketching of ideas than was the previous generations' tendencies with respect to letter and memo writing. "Show me, don't tell me!" is clearly the message of our time.

However, executives offices are still usually designed by interior decorators and these designers are rarely guided by any fundamental communications structure criteria. In other words, executive offices are designed to be comfortable, attractive, aesthetically correct and are not allowed to deviate too far from conventional standards in these respects.

This situation is beginning to change, however, as more thinking is brought to bear concerning the legitimate functional criteria for these offices. If, for example, the function of the manager's office is identified as decision making, and the strategy for implementing this identification is one of getting the options out where they can be seen, then it is self-evident that designs of an entirely different kind than that provided by interior decorators are going to be required.

What is needed, therefore, is a system for the office or the home to help man structure the flow of information so that the continuous end product of flow is meaning, that is, a better grasp of knowing what to do and when to do it, instead of the traditional product of data processing which is still largely in the form of alphabetical and Arabic encodements.

The Williams strategy is called: (1) Organize what you know—pictorially; (2) Communicate what you plan to do—pictorially. This approach not only permits "meanings" to come through faster whether in presentation or in retrieval because of the transparent file folders disclosed in my above-identified application which are used in the hold-on process, but also facilitates faster changes in meaning via moveable pictures, moveable images or icons of the "real thing."

As explained in the earlier Williams application in detail, it has been found that because man's visual sense has the greatest information capacity, a man's management and control of information is greatly facilitated by reducing information to easily visualized photographs, pictures, words or phrases, charts, diagrams and the like and displaying the same simultaneously. The displays form an instant language conveying the underlying ideas of each picture. The pictures are preferably moveable so that clusters of interrelated ideas may be formed and reformed at will. Thus integrated, the underlying patterns of the information disclosed may be more easily perceived and communicated.

Such moveable pictures provide the most practical interface between the human decision making and communication process and the modern electronic media, as for example computers and television.

Prior art management systems with the notable exception of that described in the earlier Williams application inhibit rather than facilitate the use of moveable pictures in finding a pattern or more basic idea in a cluster of interrelated ideas. Thus, in accordance with prior art management systems, a manager utilizes one tool for desktop planning, e.g. a pert chart, and this is stored in an opaque file folder. In order to display or communicate the plan, a slide or other transparency has to be made of the planning diagram. The various folders relating to the various plans under the manager's control are either scattered about his office or if he is a "clean desk" man, neatly filed away in closed filing cabinets (and often forgotten).

In the management of pictorial information such as in corporate development planning, marketing, advertising, magazine layout, museums, libraries and the like, according to the prior art photographs have to be mounted to prevent them from curling. Advertising copy has to be locked into a printing plate in order to maintain its relationship to other elements of the advertisements.

Fine art either is framed in expensive wood or metal frames for display or, more likely than not, filed in various filing systems or books where it can be looked at only one work at a time—each of which must again be framed each time it is to be displayed.

Similarly, when a lecture or other presentation is prepared according to the prior art, the visual elements of the lecture—which we all intuitively know convey the most information—must be converted from the author or lecturer's sketch, photograph, chart or the like into a rigid slide or larger transparency format of one kind or another.

All of the above prior art systems inhibit the management, control and transfer of information because they inhibit the process of converting information from the form in which it is "worked on" or filed or displayed or communicated into each of the other forms.

GENERAL DESCRIPTION OF THE INVENTION

Expressed another way, the invention provides one common tool for each and all of the individual steps entailed in the management of information; that is, the see-through transparent file jacket used for filing of ideas is the same one used for optical projection for large meetings, for planning, budgeting, etc. This is accomplished by providing cooperative force producing attaching means on the transparent file jacket and on display boards.

Various force producing means are disclosed. Magnetic strips adhered to the jacket and magnetic U-shaped easily attachable and detachable spines are preferred.

The magnetic transparent file folders of the present invention provide instant slides which may be immediately projected by means of opaque or transparency projectors. They are particularly efficacious when such projectors employ an iron bed because the magnetic file folders are rigidly held, once placed in proper position by the operator.

OBJECTS OF THE INVENTION

It is, therefore, an object of the present invention to provide a practical and flexible interface between the human decision maker and modern information media.

Another object of the invention is to provide such an interface adaptable for multimedia use.

A further object of the invention is to provide such an interface for moveable pictures.

Another object of the invention is to provide such an interface for use in an integrated system employing working, filing, retrieval, communication and display media.

A further object of the invention is to provide one common picture hold-on or display tool for all communications functions.

Still another object of the invention is to provide a transparent file folder which may be displayed in any position on a display board.

Yet another object of the invention is to provide convenient advertising displays.

A further object of the invention is to provide convenient means for displaying decorator panels.

A yet further object of the invention is to provide convenient means for displaying photographs, charts, memoranda and the like.

Still another object of the invention is to provide means for storing and instantly displaying all forms of art and visual materials.

Other objects of the invention will in part be obvious and will in part appear hereinafter.

The invention accordingly comprises the articles of manufacture, combinations of elements and a system having the features of construction, combinations of elements, arrangements of parts and providing the functions and relationships between functions which will be exemplified in the articles, constructions and systems hereinafter set forth. The scope of the invention is indicated in the claims.

THE DRAWINGS

For a fuller understanding of the nature and objects of the invention, reference should be had to the following detailed description taken in connection with the accompanying drawnigs, in which:

FIG. 1 is a front view of a magnetic display according to my invention;

FIG. 2 is a cross-section taken along the line 2—2 of FIG. 1;

FIG. 3 is a perspective view of a magnetic binder spine according to my invention;

FIG. 4A is a cross-sectional view taken along the line 4A—4A of FIG. 3;

FIG. 4B is a cross-sectional view, similar to FIG. 4A, of a modified magnetic binder spine according to my invention;

FIG. 4C is a cross-sectional view, similar to FIG. 4A, of a modified magnetic binder spine according to my invention;

FIG. 4D is a cross-sectional view, similar to FIG. 4A, of another modified magnetic binder spine according to my invention;

FIG. 5 is a perspective view of the display board of FIG. 1 mounted on a display board as disclosed in my above-identified application;

FIG. 6 is a fragmentary perspective view of a transparent file folder and magnetic binder spne according to my invention;

FIG. 7 is a fragmentary perspective view similar to FIG. 6 of a transparent file folder and magnetic binder spine according to my invention;

FIG. 8 is a perspective view of an advertising display according to my invention utilizing magnetic binder spines according to my inventon;

FIG. 9 is an enlarged cross-sectional view taken along the lines 9—9 of FIG. 1;

FIG. 10 is an enlarged cross-sectional view taken along the line 10—10 of FIG. 1;

FIG. 11 is an enlarged fragmentary cross-sectional view taken along the line 11—11 of FIG. 1;

FIG. 12 is an enlarged cross-sectional view taken along the line 12—12 of FIG. 1;

FIG. 13A is a fragmentary perspective view of a valence according to my invention utilizing a magnetic binder spine according to my invention;

FIG. 13B is a fragmentary perspective view of an advertising display according to my invention utilizing a magnetic binder spine according to my invention;

FIG. 14 is a perspective view of a matchbook held in a magnetic binder spine according to my invention; and, FIG. 15 is a side view of an opaque projector projecting the contents of a magnetic transparent file folder according to my invention.

The same reference characters refer to the same elements throughout the several views of the drawings.

SPECIFIC DESCRIPTION

More specifically referring to FIG. 1, a display 20 according to the invention comprises a magnetic display panel 22 to which articles such as a transparent file folder 24, transparent art display file folder 26, instant framed art 28, a memorandum 30, photographs 32, and chart 34 are magnetically affixed.

The display panel 22 comprises a wood frame 36, a composition board panel 38, and a thin sheet 40 of magnetically soft steel. Sheet 40 may be adhered to frame 36 and to composition board 38 which is covered by vinyl pressure adhesive sheet 42, such as sold under the trademark "Con-Tact." The steel sheet 40 is painted on its front side toward the sheet 42 to provide a good adherent surface. The vinyl sheets may be marked on with marking pens using water soluble ink. A decorative molding 44 is provided around the panel 22.

The instantly framed art work 28, the memorandum 30, photographs 32 and chart 34 are preferably magnetically attached to the panel 22 by means of my novel magnetic binder spines 46 (see FIGS. 3 and 4A). The binder spine 46 is conventional in shape, being generally U-shaped with the open ends 48 and 50 biased together so as to grip a sheet held therein (see FIGS. 10 and 11). However, it is preferable to include magnetic particles (or small magnets) within the plastic material of the binder spine 46 which are magnetized by conventional means so that the spines will be attracted to the metal plate 40.

It will be understood by those skilled in the art that alternatively the iron sheet 40 could be of cobalt, nickel or other material attracted by magnets or it could be plastic incorporating iron particles or powdered magnets. In the latter case the binder spine 46 would be made of soft iron or steel so that it would still be attracted to the panel 22. Furthermore, electrets could be substituted for the powdered magnets and incorporated either into the plate 40 or the binder spine 46. All that is required is that the binder spine and the plate be provided with cooperating force producing elements. Another possible embodiment of the invention would employ cooperating surfaces on the front of the panel 22 and at laest one side 52 of the strip 46 which would adhere to each other in the manner of the material now sold under the trademark "Velcro."

Another way to manufacture a magnetic display board for use in the invention is to employ magnetic paint, such as the magnetic latex compound sold under the trade mark L–50 by Magna-Visual, Inc. of St. Louis, Mo. For example, an acrylic plastic planning sheet may be painted with five or more coats of this material and it will support sheets held by the magnetic spines 46 of the invention. Such sheets can be dimensioned such that they fit between the rails 88 of a display board as disclosed in the earlier Williams application.

It will be understood by those versed in the economics of manufacturing and marketing that in order to economically produce the magnetic binder spine 46 shown in FIGS. 3 and 4A relatively large production is required. Therefore, for small volume manufacturing of binder spines according to the invention, one may employ the binder spine generally indicated at 54 in FIG. 4B. Here a conventional binder spine 56 of plastic or other material has adhered to it a magnetic strip 58 such as now sold for adherence to rubber stamps and the like for attaching them to a metal surface. The strip 58 is adhered by means of an adhesive to the spine 54.

One advantage of the magnetic binder spine of FIGS. 3 and 4A is that if for example a magazine photograph is mounted between two spines 46—46 as shown at 28 in FIG. 1 and there is material on the back which it is also desired to view, the entire assembly may be turned around and the other surfaces of the spines 46—46 adhered to the panel 22. The magnetic binder spine 54 of FIG. 4B can also serve this purpose if it is supplied with a second magnetic strip, as shown by dotted lines at 60 in FIG. 4B.

The spine 62 shown in FIG. 4C is formed with a straight vertical side 64 having adhered force producing means 66, crosspiece 68 at right angles to the side 64, a vertical portion 70 at right angles to crosspiece 68 and a diagonal portion 72. This shape of binder spine provides a more pleasing appearance when adhered to the panel 22 than the binder spines 46 having double diagonal sides 52 and 53 (FIG. 4A).

Photographs 32 may be displayed on the panel 22 without mounting them on stiff backing paper or the like. The magnetic binder spine 46 provides an anticurling action. If desired, one or more may be mounted between two strips as shown for the art work 28 in FIG. 1. Photographs 32 may be mounted by means of a double binder spine 74 (FIGS. 1 and 4D) having a pair of binder channels 76 and 78. The vertical portion 80 may incorporate magnetic particles or magnets or it may be provided with the magnetic strip 82.

Now referring to FIG. 5, the display panel 22 is preferably provided with a pair of hooks 84 and 86 for supporting it on a rail 88 of a display panel 90 as disclosed in my above-identified copending application. As fully described therein, a transparent file folder 24 may be suspended from pins 92, 94 thereon or may be inserted between the rails 88. Display panel 22 may be mounted thereon by means of hooks 84 and 86 by first removing some of the pins 92 and 94 from the lower rails 88.

Art work may be stored in one of the transparent file folders 24 and it may be artistically displayed by using a relatively wide binder spine 96 which, as shown in FIG. 7, covers up the key slots 98 of the file folder 24.

Alternatively a relatively narrow binder spine 100 may be employed to mount a transparent file folder 24 as shown in FIG. 6 if it is desired to leave the key slots 98 available for suspending for example a plurality of file folders 24 on pins 92 and 94 as seen in FIG. 5, In another alternative embodiment as shown in FIG. 9 a transparent file folder 24 constructed (in the manner described in my above-identified patent application) of a pair of transparent sheets 102, 104 connected by a hinge portion 106 and closed at the top by a U-shaped tape portion 108 may be provided with a magnet strip 110 at the top for suspending it on a panel 22, as shown in FIG. 1. An additional magnet strip 112 may be provided at the bottom, if desired.

As also shown in FIG. 1, the U-shaped portion 108 may be extended as at 114 so as to cover up the magnetic strip 110 of a transparent file folder 26.

Now referring to FIG. 8, a sign panel or the like 116 may be supported on a metal structure 118 in a store or office or the like by means of a pair of elongate magnetic binder spines 46, according to the invention. The metal structure 118 may be provided with a plurality of upstanding guides 120 to keep the display 116 from being easily moved if hit.

In FIG. 10 there is shown in detail how a sheet 30 may be held within a magnetic binder spine 46.

A relatively flexible sheet 124 may be supported in an instant picture frame 28 as shown in detail in FIG. 11 by layering it between a pair of transparent relativtly stiff sheets 126 and 128 which may be plastic and binding the three elements together by means of a pair of magnetic binder spines 46. If sheet 124 has art work on both sides which is desired to look at occasionally, the whole instant picture frame 28 may be turned over to see either side.

In FIG. 12 there is shown in detail how a pair of relatively stiff sheets such as photographs 32 may be held by a double binder spine 75 incorporating integral magnetic material. It will be understood by those skilled in the art that the magnetic material may be confined to the relatively vertical flat portion 81 and need not be incorporated in the other elements of the binder spine 75.

In FIG. 13A there is shown how one of the magnetic binder spines 46 may be employed to hold a valence 130 against a bracket 132 which is preferably provided with a guide 134 to prevent lateral movement of the assembly.

Similarly, a sign or advertising display 136 may be held in a magnetic binder spine 46 as shown in FIG. 13 against the bracket 138 having a horizontal portion 140 and preferably a guide lip 142. The sign or display 136 could be similarly mounted to a supermarket or drugstore shelf or end post. In FIG. 14 there is shown a matchsafe 144 which may be held by on of my magnetic binder spines 146 against the metal surface of a refrigerator, stove, metal cabinet or the like.

In FIG. 15 there is shown how art work such as shown in FIG. 11 or a transparent file folder according to the invention may be conveniently projected by means of an opaque projector generally indicated at 148. The opaque projector—and in certain embodiments transparency projectors—have a metal bed 150 of iron or steel such as is the case of the projector sold under the trademark "Vu-Lyte III" manufactured and sold by the Charles Beseler Company of East Orange, N.J. The material 152 to be projected may be held between a pair of magnetic binder spines 46 according to the invention and when placed on the metal bed 150 will not move when the projector is opened and closed by means of arm 154. The magnetic field folder 24 (FIG. 9) has the same advantage.

The projector 148 may be provided with a pair of spaced rails similar to rails 88 of FIG. 5 for guiding materials therethrough. This is particularly useful when a magnetically painted planning sheet is employed to display a plurality of magnetically attached visual elements.

It will thus be seen that there is provided a most versatile tool for the management and control of pictographic information—a transparent file folder which can hold onto the pictographic information and if desired additional related, printed or other information. The file folder may be stored in a conventional filing cabinet, instantly projected or displayed on a display board, either through suspension from pins, cooperation between rails or by cooperating magnetic means, or projected optically to the display board of the invention.

The transparent magnetic file folder is, in itself, a medium of communication; that is, it is a carrier of pictorial information. The various tools which hold-on-to, store, retrieve and present the contents of my new file folder are also integral parts of my new medium.

An important element of the design of this new medium is that it serves instantly (without further refinement or adjustment) as the copyable point of origin for all the managers' knowledge-information. In short, whether by closed circuit TV, motion picture, still photography, optical projection, electrostatic and facsimile reproduction, etc., one of the principal functions of my new tools is to serve as the photographic sets for corporate internal communications.

The product functions simultaneously in the following separate but thoroughly interrelated functional areas:

(1) Meaning-Picture hold-on, that is, for holding on to the pieces of information in a way which facilitates determining a pattern or meaning for the information being gathered, collected and positioned. In short, my system is an information processing procedure for coping with previously unstructured information and knowledge (how-to) input. This is the role of Executive programming or Communications Design we discussed above.

(2) Meaning-Picture Retrieval.

(3) Meaning-Picture Presentation for office communications and display applications.

(4) Meaning-Picture Presentation for Immediate Optical Projection.

The transparent file folder provides the additional function of an open-ended slide. It is projectable at once on an opaque projector. No delay or expense is required for a prior preparation of a transparency. Moreover, when meetings are called on short order, the manager can draw on the complete inventory of his already structured idea charts. Or, thanks to the moveable pictures technique, new structures and meaning changes can be projectable at once as the need arises.

In short, the transparent file folder and cooperating magnetic means provide for multiple but thoroughly interrelated uses. It is designed to fit into the desk top requirements of decision-making managers, all the way through the storage-retrieval function of the two-drawer filing cabinets of the above-identified application, the option identification and selection function of the display board of this and the above-identified application, the fact that the graphic modularity of the system thus provided makes it as appealing to corporate controllers as it is to marketing directors . . .

All this interrelatedness in one single common tool makes it clear enough that a practical solution to the "Missing Link" in communications has been found That the interface (the previous "Missing Link") between the human managerial decision-making process and the speed-of-light circuitry of the electronic media has been found in the simplicity of a see-through present-retrieve folder-slide-jacket. Significantly, prior to my inventions, no one had thought of making the file folder itself transparent—let alone both transparent and magnetic!

Inevitably, all major solutions man has ever found turn out to be just this simple, once the materially more complex discovery process has been successfully concluded.

The novel magnetic binder spine provides an instant picture frame for displaying any form of sheet material upon a display presentation board. Thus, meaning changes can be made easily and instantly because movable art can be rearranged and reclustered in any pattern. The flow of information can be structured so that its relevant meaning can be instantly retrieved by the executive programmer or communications designer. The moveable pictures are therefore icons which may be rearranged in new patterns for instant changes in meaning.

It will be understood by those skilled in the art that the uses of the magnetic binder spine are not limited to those disclosed in the present application but appear almost limitless.

It will thus be seen that the objects set forth above, among those made apparent from the preceding description, are efficiently attained and, since certain changes may be made in carrying out the above system, and in the described articles and combinations, without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A file folder for a system of the class described, comprising
    (A) a pair of thin flexible side walls at least one of which is transparent, said side walls being connected along the bottom edges thereof, and
    (B) cooperative adherent force producing means for adhering the file folder to a cooperative adherent force producing display board,
    (C) said file folder being sealed at the top edge thereof to form an open ended sleeve.

2. A file folder as defined in claim 1 wherein said file folder is sealed at the top by an elongated relatively wide opaque tape-like strip.

3. A file folder as defined in claim 1 and a pair of key slots adjacent the top edge thereof for suspending said file folder from a pair of pegs or rails.

4. A file folder as defined in claim 1 and projector means comprising a projection plate against which material to be projected is placed, said projection plate comprising cooperative adherent force producing means whereby said file folder may be adhered thereto thus forming an open-ended slide.

5. A system as defined in claim 4 wherein said cooperative adherent force producing means are magnetic means.

6. A file folder for a system of the class described, comprising
    (A) a pair of thin flexible side walls at least one of which is transparent, said side walls being connected along the bottom edges thereof, and
    (B) cooperative adherent force producing means comprising magnetic means for adhering the file folder to a cooperative adherent producing display board.

7. A file folder as defined in claim 6 wherein said magnetic means is integrally attached to the file folder.

8. A file folder as defined in claim 6 wherein said magnetic means comprises a strip magnet adhered to the file folder adjacent the top edge thereof.

9. A file folder as defined in claim 6 wherein said magnetic means comprises a pair of strip magnets adhered to the file folder adjacent the top and bottom edges thereof.

References Cited

UNITED STATES PATENTS

| | | | |
|---|---|---|---|
| 923,412 | 6/1909 | Dannheiser | 312—184 |
| 1,170,975 | 2/1916 | Klitsche | 312—184 |
| 1,832,239 | 11/1931 | Pedersen | 312—184 |
| 3,396,731 | 8/1968 | Peebles | 312—184 |
| 3,315,684 | 4/1967 | Karl | 40—10R |
| 3,400,477 | 9/1968 | Brown | 40—10R |
| 3,466,774 | 9/1969 | Borresen | 40—10R |

PATRICK D. LAWSON, Primary Examiner

U.S. Cl. X.R.

40—10R